(12) United States Patent
Petit

(10) Patent No.: US 6,698,623 B2
(45) Date of Patent: Mar. 2, 2004

(54) FLUID DISPENSER PUMP

(75) Inventor: Ludovic Petit, Vitot (FR)

(73) Assignee: Valois S.A., Le Neubourg (FR)

( * ) Notice: Subject to any disclaimer, the term of this patent is extended or adjusted under 35 U.S.C. 154(b) by 0 days.

(21) Appl. No.: 10/414,290

(22) Filed: Apr. 16, 2003

(65) Prior Publication Data

US 2003/0197030 A1 Oct. 23, 2003

Related U.S. Application Data

(60) Provisional application No. 60/382,046, filed on May 22, 2002.

(30) Foreign Application Priority Data

Apr. 17, 2002 (FR) .............................................. 02 04809

(51) Int. Cl.⁷ ................................................. B67B 5/00
(52) U.S. Cl. .............................. 222/153.12; 222/321.9; 222/321.7; 222/321.2
(58) Field of Search ............................. 222/321.7, 321.9, 222/321.2, 153.12, 385, 382, 380, 383.1; 239/333

(56) References Cited

U.S. PATENT DOCUMENTS

RE28,366 E * 3/1975 Pechstein .................... 239/333
4,179,049 A * 12/1979 Umstead ...................... 222/631
4,369,900 A * 1/1983 Saito et al. ............... 222/321.2
4,986,453 A * 1/1991 Lina et al. ................ 222/321.2
5,409,146 A * 4/1995 Hazard et al. ........... 222/321.8

FOREIGN PATENT DOCUMENTS

EP         0 614 702 A2    9/1994

* cited by examiner

Primary Examiner—Gene Mancene
Assistant Examiner—Frederick C Nicolas
(74) Attorney, Agent, or Firm—Sughrue Mion, PLLC

(57) ABSTRACT

A fluid dispenser pump actuated manually to dispense a metered quantity or "dose" of fluid each time it is actuated. The pump has a pump body containing a pump chamber and a return spring resiliently urging the pump towards its rest position and returning it automatically to the rest position after each actuation. The pump chamber has an outlet value that is urged towards a closed position by the pressure from the fluid while the pump is being actuated, and is opened mechanically by a valve control element at the end of actuation. Once the full dose has been prepared, the outlet valve is kept in the open position while the fluid is expelled from the pump chamber. This prevents the flow of fluid from closing the outlet valve again before the full dose of fluid has been expelled.

13 Claims, 3 Drawing Sheets

FLUID DISPENSER PUMP

CROSS REFERENCE TO RELATED APPLICATION

This application claims the benefit under 35 U.S.C. §119 (e) of pending U.S. provisional patent application Serial No. 60/382,046, filed May 22, 2002, and priority under 35 U.S.C. §119(a)–(d) of French patent application No. FR-02.04809, filed Apr. 17, 2002.

TECHNICAL FIELD

The present invention relates to a fluid dispenser pump, and more particularly to a pump actuated manually to dispense a metered quantity or "dose" of fluid each time it is actuated.

BACKGROUND OF THE INVENTION

Pumps, and in particular "metered dose" pumps that dispense a dose of substance each time they are actuated, are well known from the state of the art. They are generally used to dispense fluids, such as pharmaceuticals, cosmetics, perfumes, or the like. Such a pump generally includes a pump chamber defined between an inlet valve of the pump chamber and an outlet valve of the pump chamber. During actuation, the inlet valve is closed automatically, and after a moment, the outlet valve is opened, thereby making it possible to expel the fluid contained in the pump chamber. To improve the operation of such a pump, it has been proposed to organize the outlet valve of the pump chamber such that, while the pump is being actuated, the pressure of the fluid inside the pump chamber urges the outlet valve towards its closure position, which guarantees full leaktightness. The outlet valve is then opened mechanically, preferably at the end of actuation, once the full dose has been prepared, so as to open the passageway and enable the fluid contained in the pump chamber to be expelled. Such a pump is described in particular in French Patent Application FR 00-13569, filed on Oct. 23, 2000. Although such a pump operates satisfactorily, it can suffer from a problem affecting outlet valve operation. Since the outlet valve is urged towards its closed position by the pressure of the fluid during actuation, and then opened mechanically to enable the fluid to be expelled, there is a risk that the fluid flowing out of the pump chamber after the outlet valve has opened might return said outlet valve to its closed position, so that the dose of fluid might not be dispensed in full. Dose reproducibility is therefore not guaranteed.

BRIEF SUMMARY OF THE INVENTION

An object of the present invention is to provide a fluid dispenser pump that does not suffer from the above-mentioned drawbacks.

An object of the present invention is thus to provide a fluid dispenser pump that guarantees that each dose of fluid is dispensed in full each time the pump is actuated.

A further object of the present invention is to provide a fluid dispenser pump that is simple and inexpensive to manufacture and to assemble.

The present invention thus provides a fluid dispenser pump actuated manually to dispense a metered quantity or "dose" of fluid each time it is actuated, said pump including a pump body containing a pump chamber and a return spring resiliently urging the pump towards its rest position and returning it automatically to said rest position after each occasion on which it is actuated, said pump chamber being provided with an outlet valve, said outlet valve being urged towards a closed position by the pressure from the fluid while the pump is being actuated, and being opened mechanically by a valve control element at the end of actuation, once the full dose has been prepared, said pump being characterized in that it includes valve locking means for keeping the outlet valve in the open position while the fluid is being expelled from the pump chamber, to prevent the flow of fluid from closing said outlet valve again before the full dose of fluid has been expelled, said outlet valve being closed mechanically at the end of fluid expulsion by said valve control element under the effect of said return spring of the pump.

Advantageously, the pump chamber is defined between a first piston and a second piston, Advantageously, said valve locking means consist in wedging the outlet valve in the open position.

Advantageously, said outlet valve comprises a valve element and a valve seat, said valve element comprising a valve head co-operating in leaktight manner with said valve seat when the valve is in the closed position, and a valve body extending axially from said valve head, the diameter of said valve body being smaller than the diameter of said head, said valve body being provided with a valve foot at its end opposite from said valve head, said valve foot being of diameter larger than the diameter of said valve body, the valve control element being mounted to slide around said valve body, and co-operating mechanically with said valve foot to open the outlet valve, and with said valve head to close the outlet valve.

Advantageously, the valve seat is formed in said first piston, said valve head being inserted in said first piston with a friction force, a force greater than said friction force being necessary to move said valve head relative to said valve seat between its closed and open positions.

Advantageously, the valve seat is formed by a radial annular surface that is substantially perpendicular to the central axis of the pump and that surrounds the inlet of an expulsion channel connecting the pump chamber to a dispensing orifice, said valve head co-operating with said radial annular surface via a respective radial surface.

Advantageously, the first piston includes an axial sleeve in which said valve head is mounted to slide, the inside diameter of said axial sleeve being slightly smaller than the outside diameter of said valve head to define said friction force, and therefore to define the force necessary to move said valve head relative to said valve seat.

Advantageously, said axial sleeve is provided with abutment means such as a radial shoulder to define the open position of said valve head.

Advantageously, the surface of said axial sleeve on which said valve head slides is at least partly frustoconical.

Advantageously, said valve head is provided with fluid passageway means such as one or more openings provided in the periphery of said valve head.

The present invention also provides a fluid dispenser including a pump as described above.

BRIEF DESCRIPTION OF THE DRAWINGS

The present invention is described more fully below with reference to the accompanying drawings which are given by way of non-limiting example, and in which.

DETAILED DESCRIPTION

Figures 1, 2:
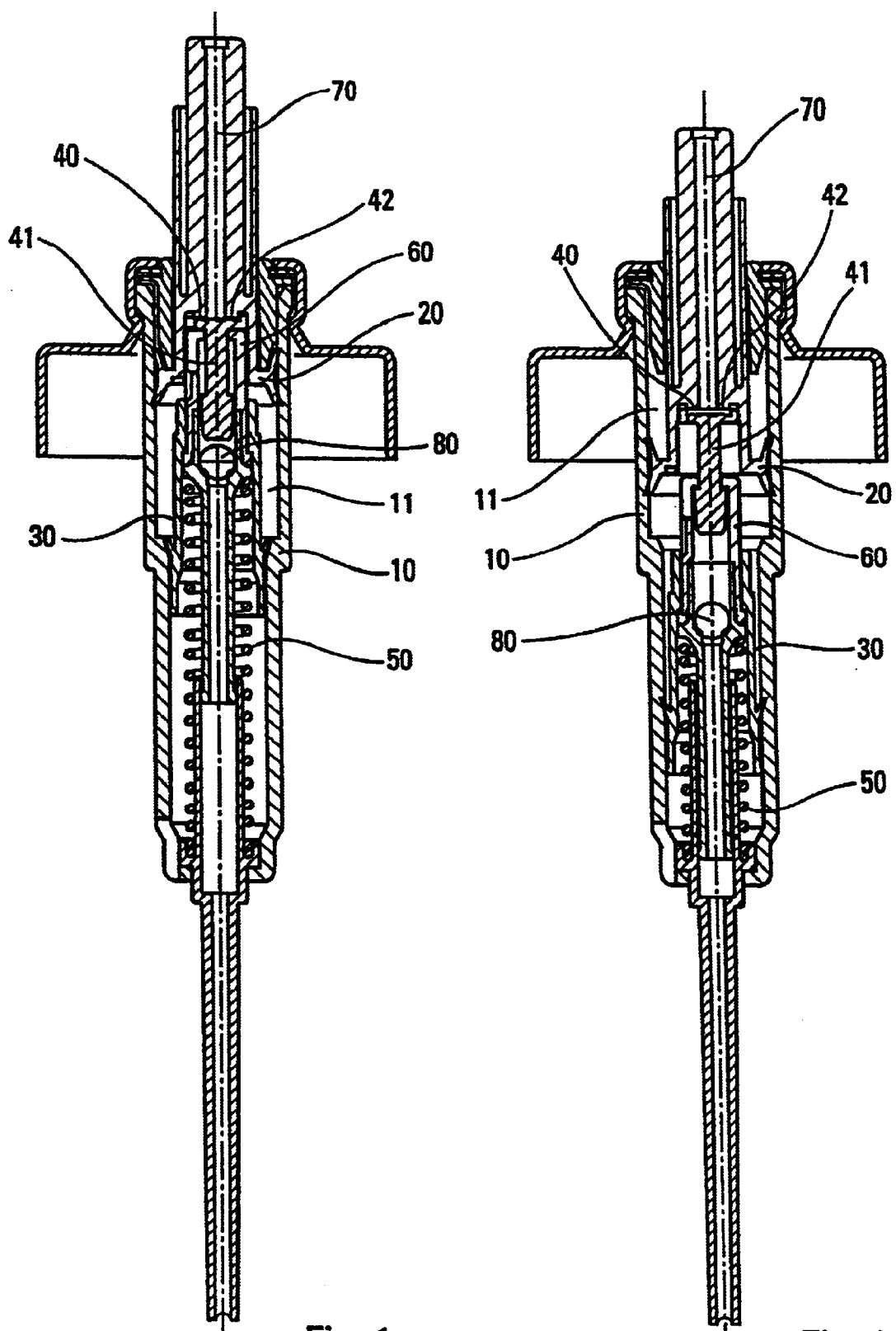
FIG. 1 is a diagrammatic section view of a fluid dispenser pump in an advantageous embodiment of the present invention, with the pump in the rest position.
FIG. 2 is a view similar to the FIG. 1 view, with the pump in the actuating position.

With reference to the drawings, the present invention relates to a pump having a pump body 10 containing a pump chamber 11. The pump chamber 11 is defined between a first piston 20, referred to as the "top piston" and a second piston 30 referred to as the "bottom piston", and the pump chamber 11 is provided with an inlet valve 80 and with an outlet valve 40. The inlet valve 80 may advantageously be in the form of a ball co-operating with a suitable valve seat. As shown in FIGS. 1 and 2, the top piston 20 is advantageously mounted to slide in a large-diameter pump body portion, and the bottom piston 30 is mounted to slide in a small-diameter pump body portion. This is conventional for this type of pump. The pump is further provided with a return spring 50 which urges the pump resiliently towards its rest position shown in FIG. 1, and which automatically returns it to this position after each occasion on which the pump is actuated. In the example shown, the return spring 50 is disposed between the pump body and the inlet valve seat 80, but any other positioning may also be imagined for the return spring 50.

The outlet valve 40 is organized such that, during actuation of the pump, it is urged by the pressure from the fluid contained in the pump chamber 11 towards its closed position, said outlet valve 40 being opened mechanically by a valve control element 60 at the end of actuation once the full metered quantity or "dose" has been prepared. The valve control element 60 cooperates firstly with the outlet valve 40 and secondly with the bottom piston 30 or with an element secured to integral therewith.

In the invention, the pump includes valve locking means for keeping the outlet valve 40 in an open position while the fluid is being expelled from the pump chamber 11. In this way, the flow of fluid out from the pump chamber 11 is prevented from closing the outlet valve 40 again before the dose contained in said pump chamber 11 has been expelled in full. The outlet valve 40 is then closed mechanically, at the end of fluid expulsion, by said valve control element 60 under the effect of the return spring 50 of the pump. Advantageously, the outlet valve locking means consist in wedging the outlet valve 40 in the open position, as described below with reference to an advantageous embodiment of the present invention.

FIGS. 1 to 4 show an advantageous embodiment of the present invention. In this embodiment, the outlet valve 40 comprises a valve element 41 that co-operates with a valve seat 42. The valve element 41 includes a valve head 43 that co-operates in leaktight manner with said valve seat 42 when the valve 40 is in the closed position. The valve element 41 further includes a valve body 44 which, in the example shown, extends axially from said valve head 43. Advantageously, the diameter of the valve body 44 is smaller than the diameter of the valve head 43, and, at its end opposite from said valve head 43, the valve body 44 has a valve foot 45 whose diameter is also larger than the diameter of said valve body 44. In this way, the valve body 44 defines a small-diameter central portion disposed between the valve head 43 and the valve foot 45. The valve control element 60 is mounted to slide around said valve body 44, in particular around said small-diameter portion, and it co-operates mechanically firstly with the valve foot 45 to open the outlet valve 40, and secondly with the valve head 43 to close the outlet valve 40 again. These outlet valve opening and closure operations are performed mechanically by said valve control element 60.

Advantageously, the valve seat 42 of the outlet valve 40 is formed inside said first or "top" piston 20, said valve head 43 being inserted in said first piston 20 with a friction force. In this way, a force greater than said friction force is necessary to move said valve head 43 relative to said valve seat 42 between said open and closed positions. Advantageously, the valve seat 42 may be formed by a transversal or radial annular surface that is substantially perpendicular to the central axis of the pump, and that surrounds the inlet 71 of an expulsion channel 70 that connects the pump chamber 11 to a dispensing orifice. Conventionally, the top piston 20 can be secured to or integral with an actuating rod that incorporates the central channel 70 for expelling the fluid. The valve head 43 advantageously co-operates with said radial annular surface 42 via a respective radial surface 43'. A particular profile may be provided at the interface between said annular radial surfaces 42 and 43' to facilitate making the outlet valve 40 leaktight when it is in the closed position. The outlet valve 40 is thus urged towards its closed position as soon as pressure is generated in the pump chamber 11, thereby guaranteeing that said valve is fully leaktight.

Figure 3:
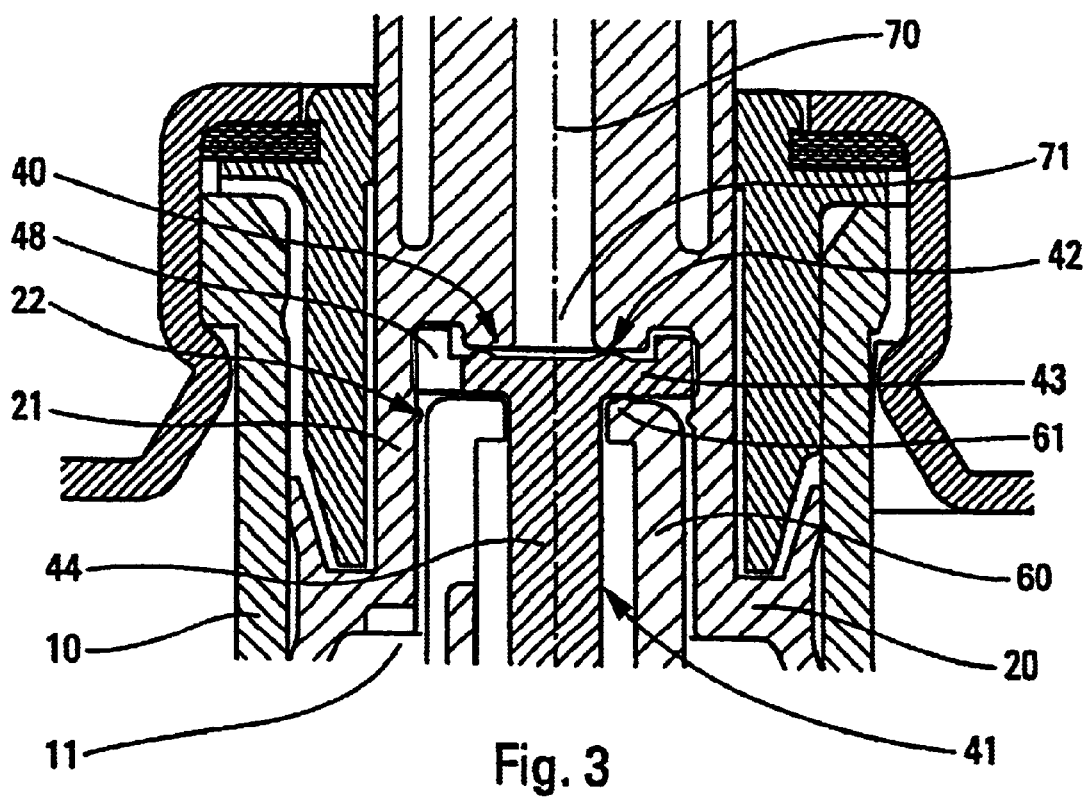
FIG. 3 is a diagrammatic section view of a detail showing the outlet valve of the pump of FIGS. 1 and 2 on an enlarged scale and in the closed position.
Figure 4:
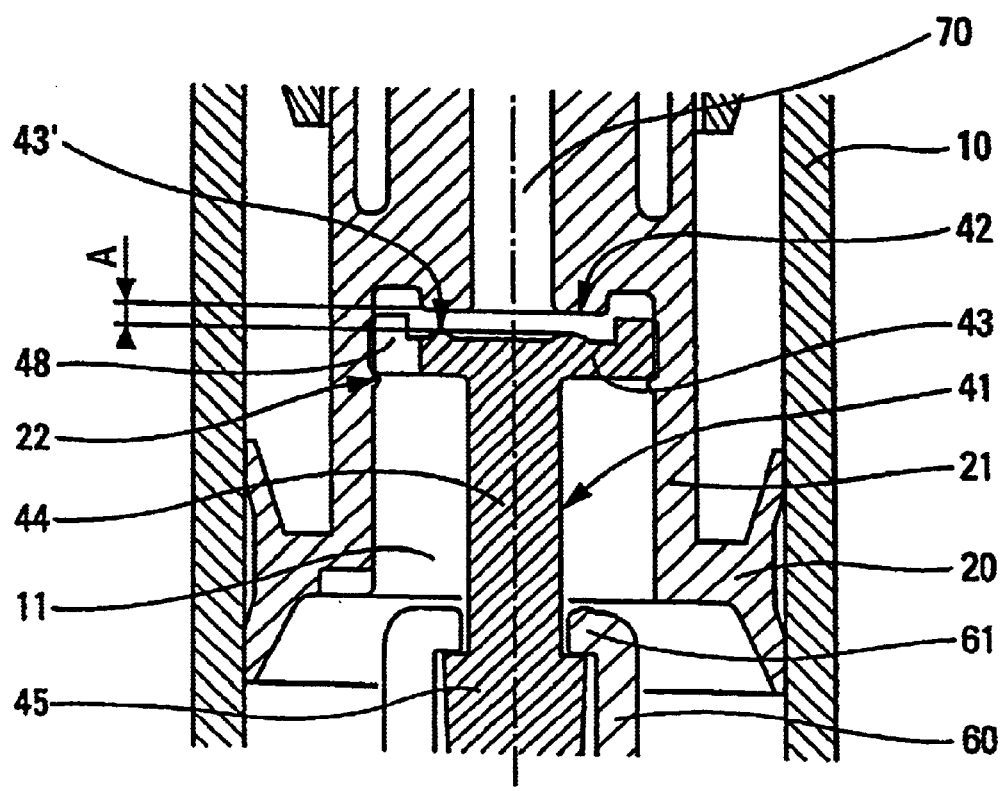
FIG. 4 is a view similar to the FIG. 3 view, with the outlet valve in the open position.
Figure 5:
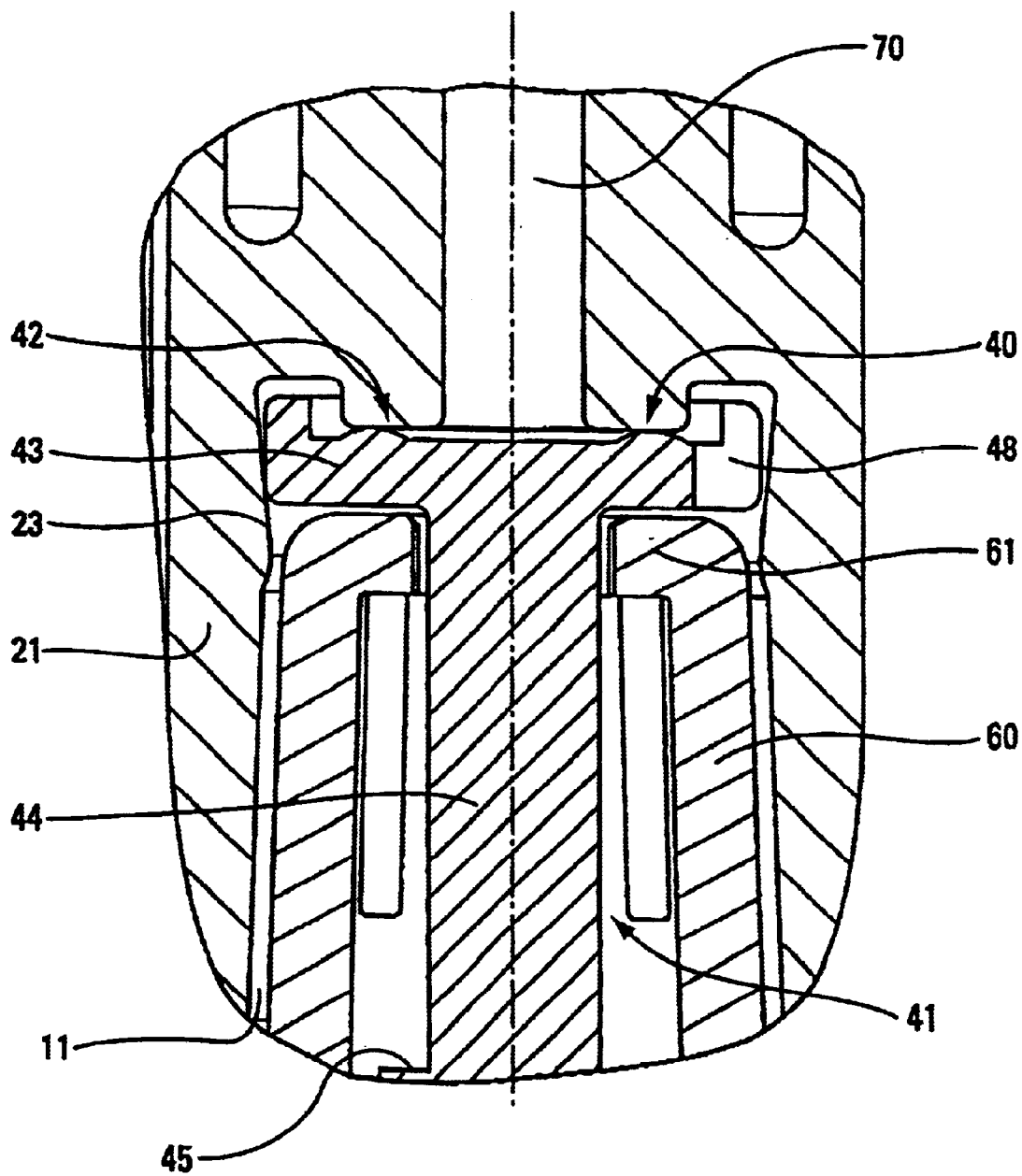
FIG. 5 is a diagrammatic view showing another embodiment of the invention, in the closed position.

Advantageously, the top piston 20 includes an inner axial sleeve 21 in which said valve head 43 is mounted to slide. To implement the invention, the inside diameter of said axial sleeve 21 may be slightly smaller than the outside diameter of said valve head 43. In this way, it is possible to define said friction force between said valve head 43 and said axial sleeve 21, and therefore the force necessary to move said valve head 43 relative to said valve seat 42. Advantageously, as shown in FIGS. 3 and 4, the axial sleeve 21 of the top piston 20 may be provided with abutment means 22, e.g. in the form of a continuous or segmented radial shoulder, to define the open position for said valve head 43. Advantageously, the surface 23 of the axial sleeve 21 on which said valve head 43 slides can be at least partly frustoconical, becoming narrower when going from the closed position to the open position, as shown on FIG. 5. Eventually, said frustoconical part 23 can be combined with an abutment shoulder as described above. Moreover, in its particular configuration shown in the drawings, the valve head 43 may be provided with fluid passageway means 48, e.g. in the form of one or more openings which may be provided in the periphery of said valve head 43.

The pump of the invention operates as follows. When the user actuates the pump starting from its rest position shown in FIG. 1, the user pushes the actuating rod, which is secured to or integral with the top piston 20, axially downwards as shown in FIG. 1, thereby generating extra pressure inside the pump chamber 11. This extra pressure automatically closes the inlet valve 80 and causes the bottom piston 30 to move under the effect of the pressure generated inside the pump chamber 11. Since the diameter of the pump body in which the bottom piston slides is smaller than the diameter of the pump body in which the top piston slides, the bottom piston 30 moves axially downwards faster than the top piston 20. As can be seen in FIGS. 1 and 2, the bottom piston 30 co-operates with the control element 60 via a radial shoulder, so that, when the bottom piston 30 is moved axially, it entrains said valve control member 60 with it. Said valve control element 60 thus slides around the small-diameter valve body 44. The valve element 41 moves with the first piston 20 while the valve control element 60 moves with the second piston 30, so that the valve control element 60 moves axially downwards faster than the valve element 41. When the valve control element 60 reaches the bottom end position, in which it co-operates via a shoulder 61 with the valve foot 45, it then entrains said valve element 41 axially downwards, so that said valve element 41 lifts off the valve seat 42 against which it was pressed by the pressure of the fluid contained in the pump chamber 11. As shown in FIG. 4, the valve element 41, and in particular the valve head 43, moves axially inside the inner axial sleeve 21 of the first piston 20 over a short distance A that is sufficient to open a passageway for the fluid contained in the pump chamber 11. The fluid contained in said pump chamber 11 then flows out via said fluid passageway 48 towards said expulsion channel 70 contained inside said first piston 20. The shoulder 22 (and/or the frustoconical surface 23), which may be provided in the side wall of the axial sleeve 21, advantageously defines the open position for the outlet valve 40, shown in FIG. 4. As shown diagrammatically and in very exaggerated manner in FIGS. 3 and 4, the outside diameter of the valve head 43 is larger than the inside diameter of the axial sleeve 21. This causes said valve head 43 to be wedged by friction in said axial sleeve 21, said friction being sufficient to keep said outlet valve 40 in the open position throughout the expulsion of the fluid contained in the pump chamber 11. There is thus no danger of the outlet valve 40 closing again before the full dose of fluid contained in the pump chamber 11 has been expelled, which makes pump operation reliable and safe, in particular as regards dose reproducibility. When the user releases the pressure on the pump, the return spring 50 returns the control element 60 axially upwards, so that said valve control element slides once again around said valve body 44 until it comes to co-operate with the valve head 43 via its shoulder 61. The friction force between the valve head 43 and the axial sleeve 21 is then defined such that it is slightly smaller than the force exerted by the return spring 50 on the valve control element 60. Thus, the valve control element 60 mechanically closes the outlet valve 40 again by pressing the valve element 41 axially back upwards into leaktight contact with the valve seat 42, in spite of the friction force existing between the valve head 43 and the axial sleeve 21 of the top piston 20.

The present invention thus provides a fluid dispenser pump in which the outlet valve is urged towards its closed position throughout the actuating stroke of the pump, thereby guaranteeing total leaktightness at said outlet valve, and the outlet valve is then opened mechanically at the end of the stroke to enable the fluid contained in the pump chamber to be expelled, the fact that the outlet valve cannot close again under the effect of the outgoing flow of fluid before the end of expulsion of the fluid contained in the pump chamber guaranteeing that the full dose contained in the pump chamber is dispensed.

The present invention is described with reference to a particular embodiment of it, but naturally any modification may be made by a person skilled in the art without going beyond the ambit of the present invention as defined by the accompanying claims. In particular, the specific form of the outlet valve, namely of its valve element and of its valve seat, and the form of the valve control element may be implemented differently provided that they perform the function of opening and closing said outlet valve mechanically. It is also possible to imagine means for locking the outlet valve in the open position that are implemented differently than by wedging. For example, it is possible to use mechanical locking means that prevent the outlet valve from closing until said locking means are released in any way whatsoever at the time when the pump returns to its rest position, after each occasion on which its actuated. Other variants may also be imagined.

What is claimed is:

1. A fluid dispenser pump actuated manually to dispense a metered quantity or "dose" of fluid each time it is actuated, said pump including a pump body (10) containing a pump chamber (11) and a return spring (50) resiliently urging the pump towards its rest position and returning it automatically to said rest position after each occasion on which it is actuated, said pump chamber (11) being provided with an outlet valve (40), said outlet valve (40) being urged towards a closed position by the pressure from the fluid while the pump is being actuated, and being opened mechanically by a valve control element (60) at the end of actuation, once the full dose has been prepared, said pump being characterized in that it includes valve locking means for keeping the outlet valve (40) in the open position while the fluid is being expelled from the pump chamber (11), to prevent the flow of fluid from closing said outlet valve (40) again before the full dose of fluid has been expelled, said outlet valve (40) being closed mechanically at the end of fluid expulsion by said valve control element (60) under the effect of said return spring (50) of the pump.

2. A pump according to claim 1, in which the pump chamber (11) is defined between a first piston (20) and a second piston (30).

3. A pump according to claim 1, in which said valve locking means consist in wedging the outlet valve (40) in the open position.

4. A pump according to claim 1, in which said outlet valve (40) comprises a valve element (41) and a valve seat (42), said valve element (41) comprising a valve head (43) co-operating in leaktight manner with said valve seat (42) when the valve (40) is in the closed position, and a valve body (44) extending axially from said valve head (43), the diameter of said valve body (44) being smaller than the diameter of said head (43), said valve body (44) being provided with a valve foot (45) at its end opposite from said valve head (43), said valve foot (45) being of diameter larger than the diameter of said valve body (44), the valve control element (60) being mounted to slide around said valve body (44), and co-operating mechanically with said valve foot (45) to open the outlet valve (40), and with said valve head (43) to close the outlet valve (40).

5. A pump according to claim 4, in which the valve seat (42) is formed in said first piston (20), said valve head (43) being inserted in said first piston (20) with a friction force, a force greater than said friction force being necessary to move said valve head (43) relative to said valve seat (42) between its closed and open positions.

6. A pump according to claim 5, in which the valve seat (42) is formed by a radial annular surface that is substantially perpendicular to the central axis of the pump and that surrounds the inlet (71) of an expulsion channel (70) connecting the pump chamber (11) to a dispensing orifice, said valve head (43) co-operating with said radial annular surface (42) via a respective radial surface (43').

7. A pump according to claim 5, in which the first piston (20) includes an axial sleeve (21) in which said valve head (43) is mounted to slide, the inside diameter of said axial sleeve (21) being slightly smaller than the outside diameter of said valve head (43) to define said friction force, and therefore to define the force necessary to move said valve head (43) relative to said valve seat (42).

8. A pump according to claim 7, in which said axial sleeve (21) is provided with abutment means (22) to define the open position of said valve head (43).

9. A pump according to claim 7, in which the surface (23) of said axial sleeve (21) on which said valve head (43) slides is at least partly frustoconical.

10. A pump according to claim 4, in which said valve head (43) is provided with fluid passageway means (48).

11. A fluid dispenser device characterized in that it includes a pump according to claim 1.

12. A pump according to claim 8, wherein said abutment means (22) is a radial shoulder.

13. A pump according to claim 10, wherein said fluid passageway means (48) is one or more openings provided in the periphery of said valve head (43).

* * * * *